(12) United States Patent
Cantagallo (10) Patent No.: US 7,697,676 B2
(45) Date of Patent: Apr. 13, 2010

(54) METHODS OF OPERATING COMMUNICATION NETWORKS INCLUDING COMMAND COMMUNICATIONS WITH IDENTIFICATIONS OF TARGET LINES/DEVICES AND INITIATING DEVICES, AND RELATED SYSTEMS AND COMPUTER PROGRAM PRODUCTS

(75) Inventor: Ronald Cantagallo, Suwanee, GA (US)

(73) Assignee: AT & T Intellectual Property I, L.P., Reno, NV (US)

( * ) Notice: Subject to any disclaimer, the term of this patent is extended or adjusted under 35 U.S.C. 154(b) by 1924 days.

(21) Appl. No.: 10/674,217

(22) Filed: Sep. 29, 2003

(65) Prior Publication Data

US 2005/0069120 A1 Mar. 31, 2005

(51) Int. Cl.
*H04M 7/00* (2006.01)
(52) U.S. Cl. .............................. 379/221.14; 379/220.01
(58) Field of Classification Search ............ 379/220.01, 379/221.14, 207.02, 221.08; 370/259, 384
See application file for complete search history.

(56) References Cited

U.S. PATENT DOCUMENTS

| | | | | |
|---|---|---|---|---|
| 5,377,186 A | * | 12/1994 | Wegner et al. ............... | 370/220 |
| 5,835,584 A | * | 11/1998 | Penttonen ................... | 379/230 |
| 5,943,409 A | * | 8/1999 | Malik ..................... | 379/209.01 |
| 6,072,857 A | * | 6/2000 | Venkateshwaran et al. ..... | 379/9 |
| 6,292,551 B1 | * | 9/2001 | Entman et al. ......... | 379/221.04 |
| 6,301,350 B1 | * | 10/2001 | Henningson et al. ... | 379/220.01 |
| 6,724,876 B2 | * | 4/2004 | Williams et al. ....... | 379/207.02 |
| 2001/0043689 A1 | * | 11/2001 | Malik ..................... | 379/114.23 |
| 2005/0063366 A1 | * | 3/2005 | Wheeler et al. ............. | 370/352 |

OTHER PUBLICATIONS

Illuminet "Signaling System 7 (SS7)"; The International Engineering Consortium, pp. 1-29 (Date Unknown).
http://www.pt.com/tutorials/ss7/isup.html "ISDN User Part" SS7 Telephony Tutorial—ISUP Aug. 18, 2003).

* cited by examiner

*Primary Examiner*—William J Deane
(74) *Attorney, Agent, or Firm*—Myers Bigel Sibley & Sajovec, P.A.

(57) ABSTRACT

Operations of a communication network may include receiving an initiating communication from an initiating device directed to a network administration application, wherein the initiating communication includes an identification of the initiating device and an identification of the network administration application. A target device for which action is being requested may be identified by the initiating device, and a command communication may be transmitted from the network service application to a subscriber line providing service for the target device. More particularly, the command communication may include the identification of the initiating device, an identification of the target device, and a code identifying the action being requested by the initiating communication. Related systems and computer program products are also discussed.

47 Claims, 2 Drawing Sheets

FIGURE 1

METHODS OF OPERATING COMMUNICATION NETWORKS INCLUDING COMMAND COMMUNICATIONS WITH IDENTIFICATIONS OF TARGET LINES/DEVICES AND INITIATING DEVICES, AND RELATED SYSTEMS AND COMPUTER PROGRAM PRODUCTS

FIELD OF THE INVENTION

The present invention relates to the field of communications, and more particularly to methods of operating communication networks and related systems and computer program products.

BACKGROUND

Various services may be offered by a public switched telephone network. A public switched telephone network, for example, may offer services such as call forwarding and/or voice mail for subscribers to the telephone network. Each such service, however, may require operation of a different network application so that a user may need to contact different applications to obtain status of and/or change status of different network services. Moreover, different human operator(s) may be required to administer status queries and/or changes for each of the different network services. Accordingly, costs of maintenance and/or human operators for different network applications may increase with the addition of new services.

SUMMARY

According to embodiments of the present invention, methods of operating a communication network may include receiving an initiating communication from an initiating device directed to a network administration application. The initiating communication may include an identification of the initiating device and an identification of the network administration application. A target device may be identified for which action is being requested by the initiating device, and a command communication may be transmitted from the network service application to a subscriber line providing service for the target device. More particularly, the command communication may include the identification of the initiating device, an identification of the target device, and a code identifying the action being requested by the initiating communication. Moreover, the communication network may be a public switched telephone network.

Receiving the initiating communication may include receiving a call initiating communication from the initiating device, and transmitting the command communication may include forwarding the call initiating communication. In addition, the identification of the initiating device and the identification of the network administration application may be included as Integrated Services digital network User Part (ISUP) parameters of the initiating communication, and the identification of the initiating device, the identification of the target device, and the code identifying an action relating to the target device may be included as Integrated Services digital network User Part (ISUP) parameters of the command communication. More particularly, the identification of the initiating device may be included in a calling party ISUP parameter field of the initiating communication, and the identification of the network administration application may be included in a called party ISUP parameter field of the initiating communication. Furthermore, the identification of the initiating device may be included in a calling party ISUP parameter field of the command communication, the identification of the target device may be included in a called party ISUP parameter field of the command communication, and the code identifying the action relating to the target device may be included in a redirecting party ISUP parameter field of the command communication.

The initiating device may be coupled to the communication network using a coupling other than the subscriber line providing service for the target device. In an alternative, the initiating device may be coupled to the communication network using the subscriber line providing service for the target device. Stated in other words, the initiating device may request information or a change relating to service for another communications device, or the initiating device may request information or a change relating to its own service.

In addition, the command communication may be received at a switch for the target device. Responsive to receiving the command communication at the switch for the target device, action relating to service for the target device may be initiated according to the code included in the command communication. For example, initiating action may include transmitting a response communication back to the network administration application, wherein the response communication includes the identification of the initiating device and a code identifying a status of service for the target device. In an alternative, initiating action may include changing a status of service for the target device.

According to additional embodiments of the present invention, methods of operating a communication network may include receiving a command communication at a switch for a target device, and the command communication may include an identification of an initiating device, an identification of the target device, and a code identifying an action relating to service for the target device. The command communication may be forwarded from the switch for the target device to a network administration application corresponding to the switch for the target device. Action may be initiated at the network administration application relating to service for the target device according to the code included in the command communication.

For example, initiating action may include transmitting a response communication, and the response communication may include the identification of the initiating device and a code identifying a status of service for the target device. In an alternative, initiating action may include changing a status of service for the target device. Moreover, the communication network may be a public switched telephone network.

More particularly, receiving the command communication may include receiving a call initiating communication, and transmitting the response communication may include forwarding the call initiating communication to a switch for the initiating device. For example, the identification of the initiating device may be included in a calling party Integrated Services digital network User Part (ISUP) parameter field of the response communication, and the code identifying the status of service for the target device may be included in a redirecting party ISUP parameter field of the response communication.

In addition, the identification of the initiating device, the identification of the target device, and the code identifying an action relating to service for the target device may be included as Integrated Services digital network User Part (ISUP) parameters of the command communication. More particularly, the identification of the initiating device may be included in a calling party ISUP parameter field of the command communication, the identification of the target device may be included in a called party ISUP parameter field of the command communication, and the code identifying the action relating to service for the target device may be included in a redirecting party ISUP parameter field of the command communication.

According to still additional embodiments of the present invention, a communications may include a network administration application. More particularly, the network administration application may be configured to receive an initiating communication from an initiating device wherein the initiating communication includes an identification of the initiating device and an identification of the network administration application. The network administration application may also be configured to identify a target device for which action is being requested by the initiating device, and to transmit a command communication from the network service application to a subscriber line providing service for the target device. In particular, the command communication may include the identification of the initiating device, an identification of the target device, and a code identifying the action being requested by the initiating communication.

According to still more embodiments of the present invention a communication network may include a switch for a target device and a network administration application corresponding to the switch for the target device. In particular, the switch may be configured to receive a command communication including an identification of an initiating device, an identification of the target device, and a code identifying an action relating to service for the target device. The switch may also be configured to forward the command communication. The network administration application may be configured to receive the command communication from the switch and to initiate action relating to service for the target device according to the code included in the command communication.

According to yet additional embodiments of the present invention, a computer program product may be configured to operate within a communications network, and the computer program product may include a computer useable storage medium having computer-readable program code embodied in the medium. In particular, the computer-readable program code may include computer-readable program code that is configured to receive an initiating communication from an initiating device directed to a network administration application. The initiating communication may include an identification of the initiating device and an identification of the network administration application. The computer-readable program code may also be configured to identify a target device for which action is being requested by the initiating device. In addition, the computer-readable program code can be configured to transmit a command communication from the network service application to a subscriber line providing service for the target device. More particularly, the command communication may include the identification of the initiating device, an identification of the target device, and a code identifying the action being requested by the initiating communication.

According to yet more embodiments of the present invention a computer program product may be configured to operate within a communications network, and the computer program product may include a computer useable storage medium having computer-readable program code embodied in the medium. The computer-readable program code may be configured to receive a command communication from a switch for a target device, and the command communication may include an identification of an initiating device, an identification of the target device, and a code identifying an action relating to service for the target device. In addition, the computer-readable program code may be configured to forward the command communication from the switch for the target device to a network administration application corresponding to the switch for the target device. The computer-readable program code may be further configured to initiate action at the network administration application relating to service for the target device according to the code included in the command communication.

Other systems, methods, and/or computer program products according to embodiments of the present invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
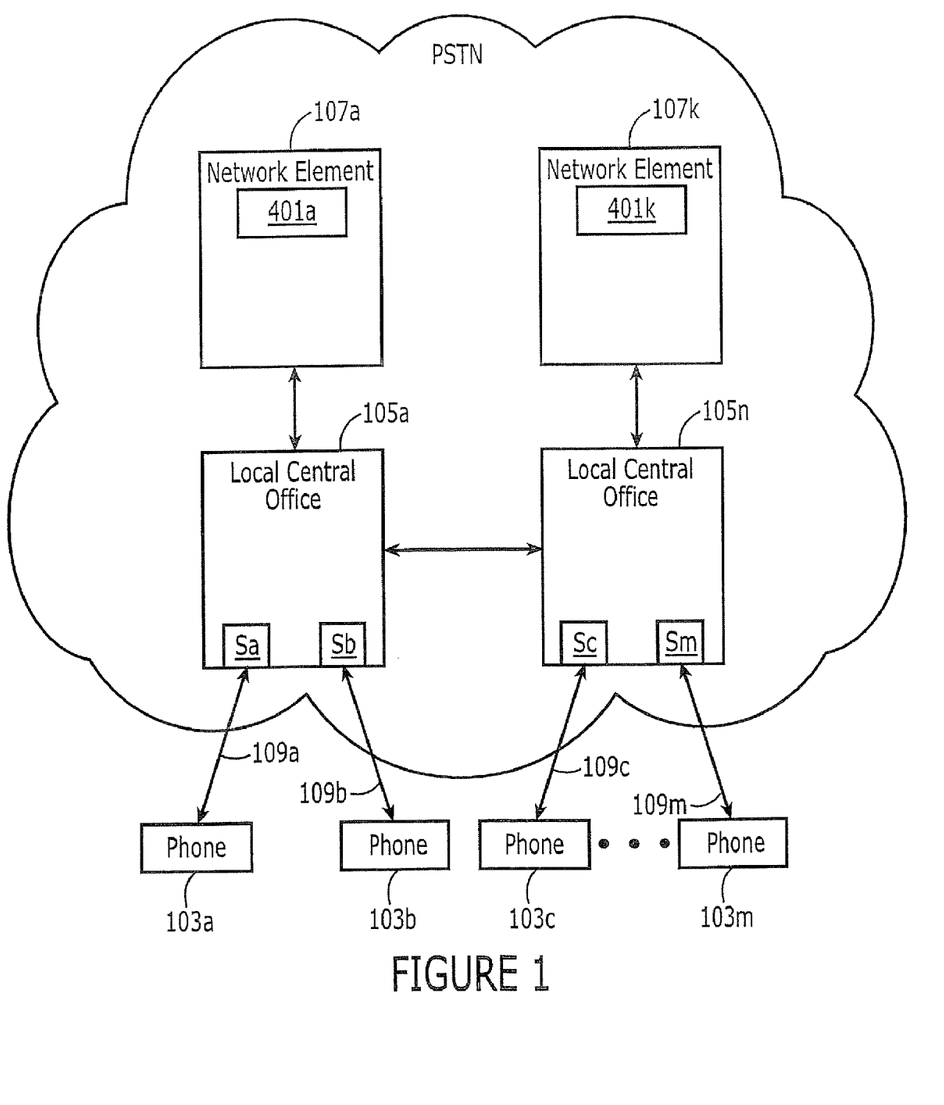
FIG. 1 is a block diagram illustrating communications networks according to embodiments of the present invention.

As illustrated in FIG. 1 according to embodiments of the present invention, a communication network 101, such as a public switched telephone network (PSTN), may provide communications services for a plurality of communications devices 103a-m (such as telephones). More particularly, the communication network 101 may include a plurality of local central offices 105a-n and/or network elements 107a-k. Moreover, each of the communications devices 103a-m may be coupled to switch Sa-m of a respective local central office 105a-n using a respective subscriber line 109a-m. As will be understood by those having skill in the art, the communication network 101 may include any number of local central offices 105 and/or network elements 107 servicing any number of communications devices 103, and/or local central offices 105 of the communication network 101 may be coupled to local central offices of other communication networks.

By way of example, the communication network 101 may be implemented as a public switched telephone network using an architecture such as the Signaling System 7 (SS7) architecture. The Signaling System 7 architecture is discussed, for example, in Illuminet, Signaling System 7 (The International Engineering Consortium, Web ProForum Tutorials, http://www.iec.org, pages 1-29) and in Performance Technologies, ISDN User Part (http://www.pt.com/tutorials/ss7/isup.html, Aug. 18, 2003). The disclosures of both of these references are hereby incorporated herein in their entirety by reference. By way of example, each local central office 105 of FIG. 1 may be defined to include one or more Signaling Switching Points (SSP) and one or more Signaling Transfer Points (STP) according to the Signaling System 7 architecture. Moreover, each network element 107 may be defined to include one or more Signaling Control Points (SCP) according to the Signaling System 7 architecture.

In addition, protocols and procedures used to set-up, manage, and release trunk circuits that carry voice and/or data calls over the communication network 101 embodying the Signaling System 7 architecture may be defined according to the Integrated Services digital network User Part (ISUP). Signaling according to ISUP protocols and procedures may thus be used to set up telephone calls between different communications devices 103. Moreover, communications between local central offices 105 and/or network elements 107 may be transmitted according to ISUP protocols and procedures.

Figure 4:
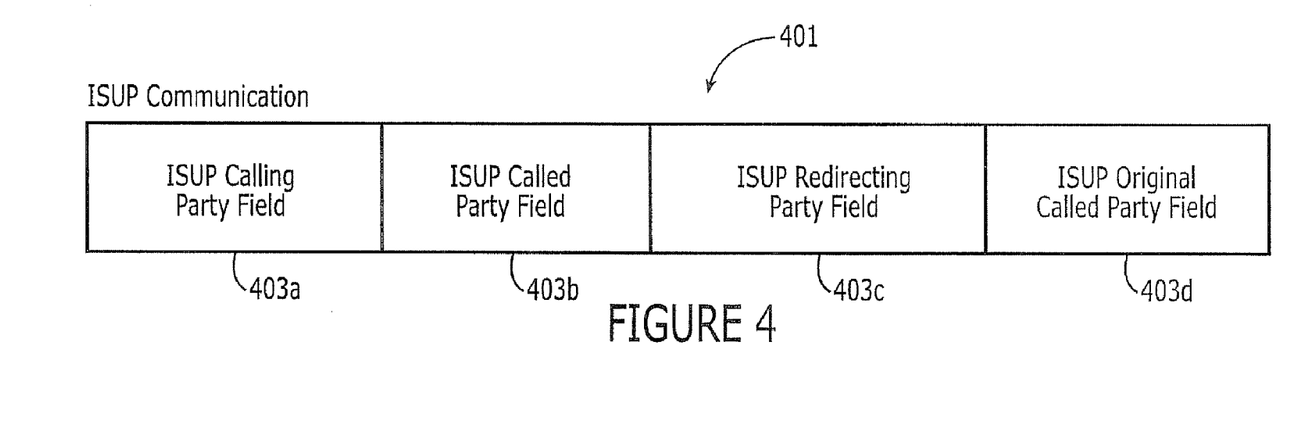
FIG. 4 is a diagram illustrating fields of an ISUP communication.

As shown in FIG. 4, an ISUP communication 401 between components of the communication network 101 may include an ISUP calling party field 403a, an ISUP called party field 403b, an ISUP redirecting party field 403c, and an ISUP original called party field 403d. When setting up a telephone call between two communications devices (i.e. two telephones), for example, a first ISUP communication may be transmitted from the calling device (first device) to a switch associated with the called device (second device). In this first ISUP communication, the calling party field 403a may be populated with the telephone number of the calling device (first device), and the called party field 403b may be populated with the telephone number for the initial called device (second device). If the initially called device (the second device) is available for communication, information provided in the ISUP fields can be used to set up a voice and/or data communication path between the first and second communications devices.

If call forwarding is activated for the initially called device (second device), the first ISUP communication may be forwarded as a second ISUP communication to a switch associated with a third communications device designated for call forwarding from the second communications device. In this second ISUP communication, the calling party field may be populated with the telephone number of the calling device (first device), the called party field may be populated with the telephone number of the third device to which the call is being forwarded, and the redirecting party field may be populated with the telephone number for the second device from which the call is being forwarded. If the third device is available for communication, information provided in the ISUP fields can be used to set up a voice and/or data communication path between the first and third communications devices.

If call forwarding is activated for the third device, the second ISUP communication may be forwarded as a third ISUP communication to a switch associated with a fourth communications device designated for call forwarding from the third communications device. In this third ISUP communication, the calling party field may be populated with the telephone number of the calling device (first device), the called party field may be populated with the telephone number of the fourth device to which the call is being forwarded, the redirecting party field may be populated with the telephone number form the third device from which the call is being forwarded, and the original called party field may be populated with the telephone number of the second device to which the call was originally placed. If the fourth device is available for communication, information provided in the ISUP fields can be used to set up a voice and/or data communication path between the first and fourth communications devices.

According to embodiments of the present invention, network administration applications 401 may reside in one or more of the network elements 107 of the communication network 101, as shown in FIG. 1. More particularly, a network administration application 401 may administer functionality of and/or provide information relating to one or a plurality of service features available to individual communications devices 103. An administration application 401, for example, may administer functionality of and/or provide information relating to one or more services, such as call forwarding (used to forward calls directed to a particular communications device to another communications device when activated by the subscriber), crisis link forwarding (used to forward calls directed to a particular communications device to another communications device if operation of the associated switch is disrupted), voice mail, and even control of residential applications (used, for example, to remotely control residential devices such as appliances, thermostats, lights, and/or video recorders over the communication network).

A network administration application residing at a particular network element 107 may be accessed remotely from a communications device 103, such as a telephone, coupled to the communication network 101 over a subscriber line 109. In an alternative, a network administration application residing at a particular network element 107 may be accessed remotely from a communications device indirectly coupled to the communication network 101 through another network, such as another public switched telephone network and/or a wireless telephone network. Moreover, an administration application may be accessed by a communication device other than a target communication device coupled to a target subscriber line for which service is to be changed or for which information is being requested. In an alternative, a target communication device coupled to a target subscriber line may access a network administration application to change service or obtain information relating to service for the target communications device.

In particular, an initiating communication device (coupled directly or indirectly to the communication network 101) may transmit an initiating communication to a network administration application residing in one of the network elements 107. Moreover, the initiating communication may include an identification of the initiating communication device (such as a telephone number of the initiating communication device) and an identification of the network administration application. By way of example, the communication device 103a may transmit an initiating communication through the subscriber line 109a and the local central office 105a to a network administration application residing at the network element 107a for service relating to a target subscriber line 109c providing service to communication device 103c.

More particularly, the initiating communication may be an ISUP call initiating communication with the identification of the initiating device (such as a 10 digit telephone number of the initiating device) and the identification of the network administration application (such as a 10 digit telephone number) being included as ISUP parameters of the initiating communication. More particularly, the identification of the initiating device may be included in a calling party ISUP parameter field of the initiating communication and the identification of the network administration application may be included in a called party ISUP parameter field of the initiating communication.

Upon receiving the initiating communication, the network administration application can then identify the target subscriber line 109 for which action is being requested by the initiating communication. For example, a call can be established between the initiating device and the network administration application, and an automatic voice menu may prompt for user input of information identifying the target subscriber line/device. More particularly, the network administration application may request entry of a 10 digit telephone number identifying the target subscriber line/device, and the 10 digit telephone number may be entered through the initiating communication device using the numeric keypad to generate Dual Tone Multiple Frequency (DTMF) tones. In an alternative, the identification of the target subscriber line/device may be provided verbally at the initiating communication device and accepted at the network administration application using voice recognition software. Accordingly, interaction with a human operator is not required when accepting information at the network administration application.

In addition, the network administration application may require entry of a password or some other verification code associated with the target subscriber line/device before taking any action responsive to an initiating communication. Accordingly, the verification code can be used to reduce unauthorized use of the network administration application. The verification code may also be used to identify the target subscriber line/device so that separate entry of identification of the target subscriber line/device is not required. The network administration application may also accept additional information from the initiating communication device identifying a particular task to perform relating to the target subscriber line/device.

By way of example, the network administration application may provide administration for a number of services such as call forwarding, crisis link forward, voice mail, and/or control of residential applications. Accordingly, the network administration application may accept entry from the initiating communication device of identification of the particular service being requested, and the particular action to take. The network administration application may provide menu driven prompts for identification of particular services and/or actions. In an alternative, different passwords may be assigned to the target subscriber line/device with each password providing both identification of a particular service for the target subscriber line/device and authorization for the target subscriber line/device. For example, a first password may be used to request a status of call forwarding for the target subscriber line/device (i.e. call forwarding on or off); a second password may be used to activate call forwarding; a third password may be used to deactivate call forwarding; a fourth password may be used to request a thermostat setting at a residence serviced by the target subscriber line/device; and a fifth password may be used to set the thermostat at the residence serviced by the target subscriber line/device.

The network administration application may then transmit a command communication to the target subscriber line/device. More particularly, the command communication may be an ISUP call initiating communication with the identification of the initiating communication device (such as the 10 digit telephone number for the initiating communication device), the identification of the target subscriber line/device (such as the 10 digit telephone number for the target subscriber line/device), and a command code identifying the action be requested by the initiating communication device being included in ISUP parameter fields of the command communication. More particularly, the identification of the initiating device may be included in a calling party ISUP parameter field of the command communication, the identification of the target subscriber line/device may be included in a called party ISUP parameter field of the command communication, and the command code identifying the action relating to the target subscriber line/device may be included in a redirecting party ISUP parameter field of the command communication.

The command code identifying the action to be requested may be provided in a 10 digit format similar to that used for a telephone number. Accordingly, the command code identifying the action may be included in the redirecting party ISUP parameter field typically used to transmit a redirecting party telephone number. Moreover, a group of the digits of the command code identifying the action may be the same for all such codes (or for multiple codes) so that a command communication including these digits can be easily identified as a command communication as opposed to a conventional call set up communication. By way of example, the fourth through sixth digits of the command code (designating a telephone exchange in a conventional telephone number) may uniquely identify a command communication as a command communication as opposed to a call set up communication. For example, the fourth through sixth digits of each command communication may be 959. As will be understood by those having skill in the art, public switched telephone network service providers have reserved the digits 959 so that the digits 959 are not used for local exchanges in the United States. Of course, other unique digits in the same and/or other parts of the command code may be used to distinguish command communications.

In addition, the last four digits (the seventh through tenth digits) of the command code may identify the particular action to be taken with respect to the target subscriber line/device. For example, 1111 may be used to request a status of call forwarding for the target subscriber line/device (i.e. call forwarding on or off); 1112 may be used to activate call forwarding; 1113 may be used to deactivate call forwarding; 1114 may be used to request a thermostat setting a residence serviced by the target subscriber line/device; and 12XX may be used to set the thermostat (to the temperature defined by numeric digits entered for XX) at the residence serviced by the target subscriber line/device.

The command communication can then be received at a switch Sc located in the central office 105*n* for the target subscriber line 109*c* coupled to the target communications device 103*c*. The command code included in the command communication can be recognized by the switch for the target subscriber line 109*c*, and the command communication can be forwarded from the switch for the target subscriber line 109*c* to a network administration application 401*k* residing at network element 107*k*. As discussed above, command code may include unique digits (such as 959 in the fourth through sixth digits) that distinguish the command communication from conventional call set up communications. On receipt of the command communication at the network administration application residing at the network element 107k, the network administration application may initiate action relating to the target subscriber line 109c according to the command code included in the command communication.

As discussed above, the command code may include fourth through sixth digits (exchange digits) that distinguish it from a conventional call set up communication. In addition, seventh through tenth digits of the command code may identify the particular action to be taken with respect to the target subscriber line/device. According to the examples discussed above, responsive to receiving a command code including 1111 in the last four digits, the receiving network administration application (residing at network element 107k) may transmit a response communication including the identification of the initiating device and a command code identifying the requested status of service for the target subscriber line/device. More particularly, the identification of the initiating device may be included as a calling party ISUP parameter field of the response communication, and the response code identifying the status of the target parameter may be included as a redirecting party ISUP parameter field of the response communication. Moreover, the identification of the initiating device may be included in the called party ISUP parameter filed of the response communication so that the response communication is directed to a switch in the local central office 105a for the subscriber line 109a coupled to the initiating device 103a.

As with command codes included in command communications, the fourth through sixth digits of the response code included in a response communication may be used to distinguish the response communication from a conventional call set up communication. For example, the digits 959 may be used as the fourth through sixth digits of both command and response codes to distinguish command and response communications from conventional call set up communications.

In addition, the last four digits of the response code may be used to convey information requested in the command communication. As discussed above, a command code may include 1111 in the last four digits thereof when requesting a status of call forwarding for the target subscriber line 109c. On receipt of a command code including 1111 in the last four digits thereof, the network administration application residing at network element 107k may check the status of call forwarding for the target subscriber line 109c. If call forwarding is enabled for the target subscriber line 109c, the network administration application may generate a response code including 2111 for the response communication. If call forwarding is disabled for the target subscriber line 109c, the network administration application may generate a response code including 2112 for the response communication.

As discussed above, the response communication including the response code may be transmitted including the identification of the initiating device in a calling party ISUP parameter field of the response communication, including the response code in a redirecting party ISUP parameter field of the response communication, and including the identification of the initiating device in the called party ISUP parameter filed of the response communication. Accordingly, the response communication can be directed to a switch Sa in the local central office 105a for the subscriber line 109a coupled to the initiating device 103a.

When the response communication is received at the switch Sa for the initiating device 109a, the response code included in the response communication may be recognized by the switch (for example using exchange digits 959) and forwarded to the network administration application 401a residing at network element 107a. According to examples discussed above, the network administration application 401a residing at network element 107a may determine the information to convey to the initiating device 103a based on the last four digits of the response code included in the redirecting party ISUP parameter field. By way of example, if the last four digits of the response code are 2111, the network administration application 401a may convey to the initiating device 103a that call forwarding for the target subscriber line 109c is enabled. If the last four digits of the response code are 2112, the network administration application 401a may convey to the initiating device 103a that call forwarding for the target subscriber line 109c is disabled. This information may be conveyed to the initiating device 103a, for example, using voice generation software over the previously established voice link. In an alternative, this information may be conveyed using voice generation software to a voice mail box associated with the initiating device 103a.

In an alternative, initiating action at the network administration application 401k residing at network element 107k may include changing a status of service for the target subscriber line 109c according to a command code received in a command communication. As discussed above, a command code may include 1112 as a last four digits when activation of call forwarding is requested for the target subscriber line/device, or a command code may include 1113 as a last four digits when deactivation of call forwarding is requested for the target subscriber line/device. Accordingly, the network administration application 401k may activate call forwarding for the target subscriber line/device responsive to a command code including 1112 and deactivate call forwarding for the target subscriber line/device responsive to a command code including 1113. Initiating the requested action may also be followed by transmitting a response communication confirming completion of the action requested in the command communication.

In examples discussed above, the communications device 103a generates an initiating communication relating to a subscriber line 109c for another communications device 103c. In an alternative, the communications device 103a may generate an initiating communication relating to the subscriber line 109a coupling the communications device 103a to the communication network 101. Stated in other words, a network administration application according to embodiments of the present invention may provide information for a target subscriber line/device and/or change a status of service for a target subscriber line/device responsive to an initiating communication received from a communications device coupled to the target subscriber line or responsive to an initiating communication received from a communications device coupled to the communication network 101 via a coupling other than the target subscriber line.

Figure 2:
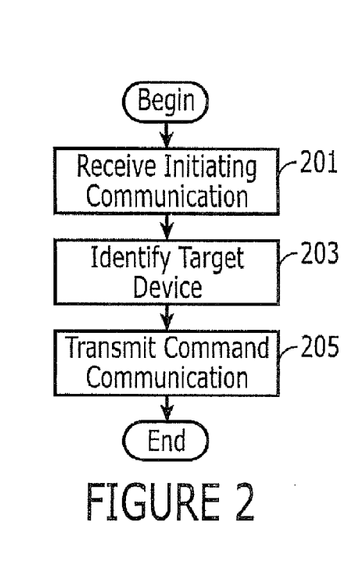
FIGS. 2 and 3 are flow charts illustrating operations of communications networks according to embodiments of the present invention.
Figure 3:
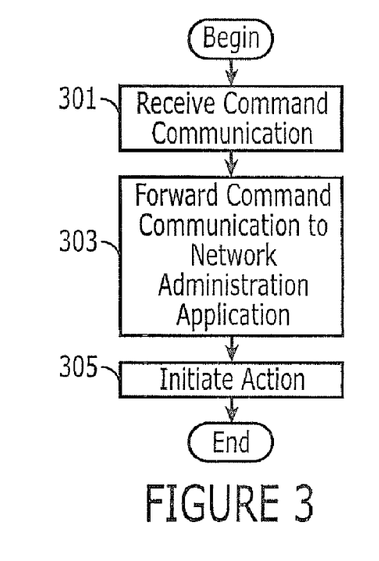

Operations according to further embodiments of the present invention are illustrated in FIGS. 2 and 3. More particularly, FIG. 2 illustrates operations including receiving an initiation communication and transmitting a command communication. FIG. 3 illustrates operations including receiving a command communication and initiating action relating to a target subscriber line/device.

As shown in FIG. 2, a network administration application may receive an initiating communication from an initiating communication device, such as a telephone, at block 201, and the initiating communication may include an identification of the initiating device and an identification of the network administration application. More particularly, the initiating communication may have the format of a call initiating communication, with the identification of the initiating device and the identification of the network administration application being included as Integrated Services digital network User Part (ISUP) parameters of the initiating communication. By way of example, the identification of the initiating device may be included in a calling party ISUP parameter field of the initiating communication, and the identification of the network administration application can be included in a called party ISUP parameter field of the initiating communication.

At block 203, a target subscriber line/device may be identified for which action is being requested. More particularly, the initiating communication may be used to establish a voice communication between the initiating device transmitting the initiating communication and the network administration application receiving the initiating communication. For example, the network administration application may use recorded and/or computer generated voice prompts to solicit entry at the initiating device of identification of the target subscriber line/device, the action to be taken with respect to the target subscriber line/device, and/or any verification information (such as a password). Responses may be received, for example, as DTMF tones and/or as voice responses which may be interpreted using voice recognition software. The target subscriber line/device may be identified, for example, by entering the corresponding 10 digit telephone number for the target subscriber line/device, and different passwords may be used to both validate authorization to initiate action with respect to the target subscriber line/device and to identify the particular action being requested.

At block 205, a command communication may be transmitted from the network service application to the target subscriber line/device, and the command communication may include an identification of the initiating device, an identification of the target subscriber line/device, and a code identifying the action being requested by the initiating communication. More particularly, the command communication may include the identification of the initiating device, the identification of the target subscriber line/device, and the code identifying the action relating to the target subscriber line/device as Integrated Serviced digital network User Part (ISUP) parameters of the command communication. In particular, the identification of the initiating device may be included in a calling party ISUP parameter field of the command communication, the identification of the target subscriber line/device may be included in a called party ISUP parameter field of the command communication, and the code identifying the action relating to service for the target subscriber line/device may be included in a redirecting party ISUP parameter field of the command communication. The command communication may thus be transmitted to a switch for the target subscriber line/device.

The command communication may be received at a switch for the target subscriber line at block 301, and the switch for the target may recognize the command communication as being a command communication because of the command code included therein. Accordingly, the command communication may be forwarded from the switch for the target subscriber line/device to a network administration application at block 303. At block 305, action relating to the target subscriber line/device may be initiated at the network administration application according to the code included in the command communication.

For example, initiating action at block 305 may include transmitting a response communication wherein the response communication includes the identification of the initiating device (such as a 10 digit telephone number of the initiating device) and a response code identifying a requested status of service for the target subscriber line/device. More particularly, the identification of the initiating device can be included in a calling party ISUP parameter field of the response communication, and the code identifying the status of service for the target subscriber line/device can be included in a redirecting party ISUP parameter filed of the response communication. In addition or in an alternative, initiating action at block 305 may include changing a status of service for the target subscriber line/device.

According to some embodiments of the present invention, operations of FIG. 2 may be performed at a first network element providing service for a first communications device that generates an initiating communication, and operations of FIG. 3 may be performed at a second network element providing service for a second communications device through a target subscriber line. According to other embodiments of the present invention, operations of FIG. 2 may be performed at a network element providing service for a first communications device that generates an initiating communication, and operations of FIG. 3 may be performed at the same network element when the same network element provides service for a second communications device through a target subscriber line. According to still other embodiments, operations of FIGS. 2 and 3 may be performed by the same network element when an initiating communications device generates an initiating communication relating to service for the subscriber line servicing the initiating communication device.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described herein in the context of public switched telephone network (PSTN) technology for purposes of illustration. It will be understood that the present invention is not limited to PSTN technology. Indeed, other communication technologies and/or network configurations, such as, but not limited to, wired data networks, wireless data networks, WiFi networks, cellular networks, Personal Communications Services (PCS) networks, satellite communications networks, ultrawideband networks, and/or Bluetooth networks, may also be used in other embodiments of the present invention. In general, the present invention is not limited to any communication technology and/or network configuration, but is intended to encompass any technology and/or network configuration capable of carrying out operations described herein.

The present invention is described above with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of operating a communication network, the method comprising:
   receiving a call initiating communication from an initiating device at a network administration application, the call initiating communication including an identification of the initiating device and an identification of the network administration application;
   obtaining an identification of a target device for which action is being requested by the initiating device; and
   forwarding the call initiating communication as a command communication from the network administration application to a switch for a subscriber line providing service for the target device, the command communication including the identification of the initiating device, the identification of the target device, and a code identifying the action being requested by the command communication.

2. A method according to claim 1 wherein the communication network comprises a public switched telephone network.

3. A method according to claim 1 wherein the identification of the initiating device and the identification of the network administration application are included as Integrated Services digital network User Part (ISUP) parameters of the call initiating communication, and wherein the identification of the initiating device, the identification of the target device, and the code identifying an action relating to the target device are included as Integrated Services digital network User Part (ISUP) parameters of the command communication;
   wherein the identification of the initiating device is included in a calling party ISUP parameter field of the call initiating communication, wherein the identification of the network administration application is included in a called party ISUP parameter field of the call initiating communication;
   wherein the identification of the initiating device is included in a calling party ISUP parameter field of the command communication, wherein the identification of the target device is included in a called party ISUP parameter field of the command communication, and wherein the code identifying the action relating to the target device is included in a redirecting party ISUP parameter field of the command communication.

4. A method according to claim 1 wherein the initiating device is coupled to the communication network using a coupling other than the subscriber line providing service for the target device.

5. A method according to claim 1 wherein the initiating device is coupled to the communication network using the subscriber line providing service for the target device.

6. A method according to claim 1 further comprising:
   receiving the command communication at the switch for the subscriber line providing service for the target device; and
   responsive to receiving the command communication at the switch for the subscriber line providing service for the target device, initiating action relating to service for the target device according to the code included in the command communication.

7. A method according to claim 6 wherein initiating action comprises transmitting a response communication back to the network administration application, the response communication including the identification of the initiating device and a code identifying a status of service for the target device.

8. A method according to claim 6 wherein initiating action comprises changing a status of service for the target device according to the code included in the command communication.

9. A method of operating a communication network, the method comprising:
   receiving a command communication as a call initiating communication at a switch for a target device, the command communication including an identification of an initiating device, an identification of the target device, and a code identifying an action relating to service for the target device;
   forwarding the command communication from the switch for the target device to a network administration application corresponding to the switch for the target device; and initiating action at the network administration application relating to service for the target device according to the code included in the command communication;

wherein initiating action comprises transmitting a response communication, the response communication including the identification of the initiating device and a code identifying a status of service for the target device.

10. A method according to claim 9 wherein the communication network comprises a public switched telephone network.

11. A method according to claim 10 wherein transmitting the response communication comprises forwarding the call initiating communication to a switch for the initiating device.

12. A method according to claim 9 wherein the identification of the initiating device is included in a calling party Integrated Services digital network User Part (ISUP) parameter field of the response communication, and wherein the code identifying the status of service for the target device is included in a redirecting party ISUP parameter field of the response communication.

13. A method according to claim 9 wherein initiating action comprises changing a status of service for the target device according to the code included in the command communication.

14. A method according to claim 9 wherein the communication network comprises a public switched telephone network.

15. A method according to claim 9 wherein the identification of the initiating device, the identification of the target device, and the code identifying an action relating to service for the target device are included as Integrated Services digital network User Part (ISUP) parameters of the command communication.

16. A method according to claim 15 wherein the identification of the initiating device is included in a calling party ISUP parameter field of the command communication, wherein the identification of the target device is included in a called party ISUP parameter field of the command communication, and wherein the code identifying the action relating to service for the target device is included in a redirecting party ISUP parameter field of the command communication.

17. A method according to claim 9 wherein the initiating device is coupled to the communication network using a coupling other than a subscriber line for the target device.

18. A method according to claim 9 wherein the initiating device is coupled to the communication network using a subscriber line for the target device.

19. A communication network comprising:
a network administration application configured to receive a call initiating communication from an initiating device, the call initiating communication including an identification of the initiating device and an identification of the network administration application, the network administration application configured to obtain an identification of a target device for which action is being requested by the initiating device, and the network administration application configured to forward the call initiating communication as a command communication from the network administration application to a switch for a subscriber line providing service for the target device, the command communication including the identification of the initiating device, the identification of the target device, and a code identifying the action being requested by the command communication.

20. A communication network according to claim 19 wherein the communication network comprises a public switched telephone network.

21. A communication network according to claim 19 wherein the identification of the initiating device and the identification of the network administration application are included as Integrated Services digital network User Part (ISUP) parameters of the call initiating communication, and wherein the identification of the initiating device, the identification of the target device, and the code identifying an action relating to the target device are included as Integrated Services digital network User Part (ISUP) parameters of the command communication;

wherein the identification of the initiating device is included in a calling party ISUP parameter field of the call initiating communication, wherein the identification of the network administration application is included in a called party ISUP parameter field of the call initiating communication;

wherein the identification of the initiating device is included in a calling party ISUP parameter field of the command communication, wherein the identification of the target device is included in a called party ISUP parameter field of the command communication, and wherein the code identifying the action relating to the target device is included in a redirecting party ISUP parameter field of the command communication.

22. A communication network according to claim 19 wherein the initiating device is coupled to the communication network using a coupling other than the subscriber line providing service for the target device.

23. A communication network according to claim 19 wherein the initiating device is coupled to the communication network using the subscriber line providing service for the target device.

24. A communication network according to claim 19 wherein the switch is configured to receive the command communication, the network further comprising:
a second network administration application configured to initiate action relating to service for the target device according to the code included in the command communication responsive to receiving the command communication at the switch for the subscriber line providing service for the target device.

25. A communication network according to claim 24 wherein the second network administration application is configured to transmit a response communication back to the network administration application, the response communication including the identification of the initiating device and a code identifying a status of service for the target device.

26. A communication network according to claim 24 wherein the second network administration application is configured to change a status of service for the target device according to the code included in the command communication.

27. A communication network comprising:
a switch for a target device, the switch configured to receive a command communication as a call initiating communication including an identification of an initiating device, an identification of the target device, and a code identifying an action relating to service for the target device, wherein the switch is configured to forward the command communication; and
a network administration application corresponding to the switch for the target device, the network administration application configured to receive the command communication from the switch and configured to initiate action relating to service for the target device according to the code included in the command communication;

wherein the network administration application is further configured to transmit a response communication, the response communication including the identification of the initiating device and a code identifying a status of service for the target device.

28. A communication network according to claim 27 wherein the communication network comprises a public switched telephone network.

29. A communication network according to claim 28 wherein the switch is further configured to transmit the response communication by forwarding the call initiating communication to a switch for the initiating device.

30. A communication network according to claim 28 wherein the identification of the initiating device is included in a calling party Integrated Services digital network User Part (ISUP) parameter field of the response communication, and wherein the code identifying the status of service for the target device is included in a redirecting party ISUP parameter field of the response communication.

31. A communication network according to claim 27 wherein the network administration application is configured to initiate action by changing a status of service for the target device.

32. A communication network according to claim 27 wherein the communication network comprises a public switched telephone network.

33. A communication network according to claim 27 wherein the identification of the initiating device, the identification of the target device, and the code identifying an action relating to service for the target device are included as Integrated Services digital network User Part (ISUP) parameters of the command communication.

34. A communication network according to claim 33 wherein the identification of the initiating device is included in a calling party ISUP parameter field of the command communication, wherein the identification of the target device is included in a called party ISUP parameter field of the command communication, and wherein the code identifying the action relating to service for the target device is included in a redirecting party ISUP parameter field of the command communication.

35. A communication network according to claim 27 wherein the initiating device is coupled to the communication network using a coupling other than a subscriber line for the target device.

36. A communication network according to claim 27 wherein the initiating device is coupled to the communication network using a subscriber line for the target device.

37. A computer program product configured to operate within a communications network, the computer program product comprising a computer useable storage medium having computer-readable program code embodied in the medium, the computer-readable program code comprising:
   computer-readable program code that is configured to receive a call initiating communication from an initiating device directed to a network administration application, the call initiating communication including an identification of the initiating device and an identification of the network administration application;
   computer-readable program code that is configured to obtain an identification of a target device for which action is being requested by the initiating device; and
   computer-readable program code that is configured to forward the call initiating communication as a command communication for a switch for a subscriber line providing service for the target device, the command communication including the identification of the initiating device, the identification of the target device, and a code identifying the action being requested by the command communication.

38. A computer program product according to claim 37 wherein the identification of the initiating device is included in a calling party Integrated Services digital network User Part (ISUP) parameter field of the call initiating communication, and wherein the identification of the network administration application is included in a called party ISUP parameter field of the call initiating communication.

39. A computer program product according to claim 38 wherein the identification of the initiating device is included in a calling party Integrated Services digital network User Part (ISUP) parameter field of the command communication, wherein the identification of the target device is included in a called party ISUP parameter field of the command communication, and wherein the code identifying the action relating to the target device is included in a redirecting party ISUP parameter field of the command communication.

40. A computer program product configured to operate within a communications network, the computer program product comprising a computer useable storage medium having computer-readable program code embodied in the medium, the computer-readable program code comprising:
   computer-readable program code that is configured to receive a command communication as a call initiating communication including an identification of an initiating device, an identification of a target device, and a code identifying an action relating to service for the target device; and
   computer-readable program code that is configured to initiate action at a network administration application relating to service for the target device according to the code included in the command communication wherein initiating action comprises transmitting a response communication, the response communication including the identification of the initiating device and a code identifying a status of service for the target device.

41. A method according to claim 40 wherein the identification of the initiating device is included in a calling party ISUP parameter field of the command communication, wherein the identification of the target device is included in a called party ISUP parameter field of the command communication, and wherein the code identifying the action relating to service for the target device is included in a redirecting party ISUP parameter field of the command communication.

42. A method according to claim 1 wherein the code identifying the action relating to the target device is included in a redirecting party field of the command communication.

43. A communications network according to claim 19 wherein the code identifying the action relating to the target device is included in a redirecting party field of the command communication.

44. A computer program product according to claim 37 wherein the code identifying the action relating to the target device is included in a redirecting party field of the command communication.

45. A method according to claim 9 wherein the code identifying the action relating to service for the target device is included in a redirecting party field of the command communication.

46. A communications network according to claim 27 wherein the code identifying the action relating to service for the target device is included in a redirecting party field of the command communication.

47. A computer program product according to claim 40 wherein the code identifying the action relating to service for the target device is included in a redirecting party field of the command communication.

* * * * *